(12) United States Patent
Nishiyama

(10) Patent No.: US 11,597,138 B2
(45) Date of Patent: Mar. 7, 2023

(54) HIGH-PRESSURE TANK PRODUCING APPARATUS

(71) Applicant: TOYOTA JIDOSHA KABUSHIKI KAISHA, Toyota (JP)

(72) Inventor: Tomohiko Nishiyama, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 86 days.

(21) Appl. No.: 17/130,223

(22) Filed: Dec. 22, 2020

(65) Prior Publication Data

US 2021/0237338 A1  Aug. 5, 2021

(30) Foreign Application Priority Data

Jan. 30, 2020 (JP) .............................. JP2020-013375

(51) Int. Cl.
*B29C 35/04* (2006.01)
*F27B 9/30* (2006.01)
(Continued)

(52) U.S. Cl.
CPC ........ *B29C 63/0004* (2013.01); *B29C 35/045* (2013.01); *F17C 1/00* (2013.01);
(Continued)

(58) Field of Classification Search
CPC ..... B29C 35/02; B29C 35/0227; B29C 35/04; B29C 35/045; B29C 2035/046; B29C 2035/047; B29C 53/602; B29C 53/605; B29C 63/0004; B29L 2031/7156; B29L 2031/7172; F17C 1/00; F17C 1/16;
(Continued)

(56) References Cited

U.S. PATENT DOCUMENTS 9,586,345 B2 * 3/2017 Kondo ................ B29C 35/0227
2010/0127418 A1 * 5/2010 Davidson .............. F27B 9/3011
425/445

(Continued)

FOREIGN PATENT DOCUMENTS

JP 2012-171173 A 9/2012
JP 2017-217787 A 12/2017
(Continued)

*Primary Examiner* — Michael A Tolin
(74) *Attorney, Agent, or Firm* — Finnegan, Henderson, Farabow, Garrett & Dunner, LLP

(57) ABSTRACT

A high-pressure tank producing apparatus capable of reducing time for increasing temperature of a tank body. The apparatus that heats the tank body with fibers impregnated with a thermosetting resin wound around its surface includes a heating chamber for housing the tank body and a retaining mechanism for retaining the tank body within the heating chamber, in which the heating chamber has an injection port for injecting heated gas onto the surface of the tank body and an exhaust port for discharging the gas to the outside of the heating chamber, the exhaust port being disposed in a position where the injection port is projected in a gas injecting direction, and the retaining mechanism retains the tank body in a region where the injection and exhaust ports overlap with each other as viewed from the gas injecting direction and in a position between the injection and exhaust ports.

3 Claims, 4 Drawing Sheets

(51) Int. Cl.
*B29C 63/00* (2006.01)
*F17C 1/00* (2006.01)
*F27B 17/00* (2006.01)
*B29L 31/00* (2006.01)

(52) U.S. Cl.
CPC ........ *F27B 9/3011* (2013.01); *F27B 17/0083* (2013.01); *B29C 2035/046* (2013.01); *B29L 2031/7156* (2013.01); *B29L 2031/7172* (2013.01); *F17C 2201/0109* (2013.01); *F17C 2203/0663* (2013.01); *F17C 2209/232* (2013.01)

(58) Field of Classification Search
CPC ........ F17C 2201/0109; F17C 2201/056; F17C 2201/058; F17C 2203/0604; F17C 2203/0619; F17C 2203/0663; F17C 2209/00; F17C 2209/21; F17C 2209/2127; F17C 2209/23; F17C 2209/232; F17C 2221/012; F17C 2223/0123; F17C 2223/036; F17C 2270/0168; F17C 2270/0184; F27B 5/16; F27B 2005/166; F27B 2005/167; F27B 2005/168; F27B 2005/169; F27B 9/3005; F27B 9/3011; F27B 17/0083; Y02E 60/32
See application file for complete search history.

(56) References Cited

U.S. PATENT DOCUMENTS

2011/0037196 A1\* 2/2011 Arena Fernandez . F27B 9/2423
264/234
2018/0281240 A1\* 10/2018 Hatta .................... B29C 35/045
2018/0333900 A1 11/2018 Hatta et al.
2019/0195429 A1\* 6/2019 Ueda ....................... B29C 70/32

FOREIGN PATENT DOCUMENTS

| | | |
|---|---|---|
| JP | 2018-171717 A | 11/2018 |
| JP | 2018-192742 A | 12/2018 |

\* cited by examiner

HIGH-PRESSURE TANK PRODUCING APPARATUS

CROSS REFERENCE TO RELATED APPLICATIONS

The present application claims priority from Japanese patent application JP 2020-013375 filed on Jan. 30, 2020, the entire content of which is hereby incorporated by reference into this application.

BACKGROUND

Technical Field

The present disclosure relates to a high-pressure tank producing apparatus that heats a tank body with fibers impregnated with a thermosetting resin wound around its surface so as to cure the thermosetting resin.

Background Art

High-pressure tanks, such as a hydrogen tank, mounted on fuel cell vehicles, hydrogen vehicles, and the like are required to have enough strength to endure high pressures and to be lightweight. As a method for producing such a high-pressure tank, there has been known a method in which while a cylindrical liner is being rotated, carbon fibers impregnated with a thermosetting resin, such as an epoxy resin, are repeatedly wound around the surface of the liner to produce a tank body and subsequently, the thermosetting resin is thermally cured.

As a tank producing apparatus in which a thermosetting resin of a tank body is cured, for example, JP 2018-171717 A describes a fuel tank producing apparatus (high-pressure tank producing apparatus) including a heat curing furnace (heating chamber) for housing a tank container (tank body) laid on its side (with the central axis of the tank container extending in the horizontal direction), a gas blowing portion disposed above the tank container and adapted to inject a high-temperature gas toward the tank container, and an exhaust duct for discharging the gas inside the heat curing furnace to the outside.

SUMMARY

To reduce the time for heat treatment of the tank container (tank body) by increasing the temperature of the tank container for a short period of time, the average heat transfer rate of the overall surface of the tank container (tank body) needs to be increased.

However, in the fuel tank producing apparatus of the aforementioned JP 2018-171717 A, the gas injected from the gas blowing portion is blown onto the tank container, and then flows toward the exhaust duct disposed in a direction opposite to the gas injecting direction (above the tank container). Therefore, the high-temperature gas does not easily flow in a lower portion of the tank container, and thus, the heat transfer rate of the surface in the lower portion of the tank container is decreased. This takes time for increasing the temperature of the tank container (tank body), causing a problem of a longer time required for heat treatment of the tank container.

The present disclosure has been made in view of the foregoing, and provides a high-pressure tank producing apparatus capable of reducing the time for increasing the temperature of the tank body.

The high-pressure tank producing apparatus according to the present disclosure, which heats a tank body with fibers impregnated with a thermosetting resin wound around its surface so as to cure the thermosetting resin, includes a heating chamber adapted to house the tank body and a retaining member adapted to retain the tank body within the heating chamber, in which the heating chamber has an injection port for injecting heated gas onto the surface of the tank body and an exhaust port for discharging the gas to the outside of the heating chamber, the exhaust port being disposed in a position where the injection port is projected in the gas injecting direction, and the retaining member retains the tank body in a region where the injection port and the exhaust port overlap with each other as viewed from the gas injecting direction and in a position between the injection port and the exhaust port.

According to the high-pressure tank producing apparatus of the present disclosure, the exhaust port is disposed in a position where the injection port is projected in the gas injecting direction, and the retaining member retains the tank body in a region where the injection port and the exhaust port overlap with each other as viewed from the gas injecting direction and in a position between the injection port and the exhaust port. With such a structure, a high-temperature gas injected from the injection port flows toward the exhaust port after abutting a portion facing the injection port of the tank body. At this time, since the exhaust port is disposed on the side opposite to the injection port across the tank body, the high-temperature gas flows along the surface of the tank body from a portion on the injection port side to a portion on the exhaust port side (the side opposite to the injection port) of the tank body. This allows the heat of the high-temperature gas to be transferred to a wider region on the surface of the tank body, so that the average heat transfer rate of the overall surface of the tank body is increased. Further, with the exhaust port disposed on the side opposite to the injection port across the tank body, the gas is unlikely to stagnate in a portion on the exhaust port side (the side opposite to the injection port) of the tank body, so that the gas flow becomes faster. This increases the heat transfer rate in the portion on the exhaust port side as well as the portion on the injection port side on the surface of the tank body, which also increases the average heat transfer rate of the overall surface of the tank body. Therefore, the time for increasing the temperature of the tank body can be reduced, so that the time for heat treatment of the tank body can be shortened. It is needless to mention that the heat transfer rate described in the present specification and the scope of the claims refers to the rate of heat transfer between the tank body and the gas.

In the aforementioned high-pressure tank producing apparatus, in some embodiments, the tank body includes a cylindrical cylinder portion and dome portions provided in opposite end portions in the axial direction of the cylinder portion, in which the injection port is provided so as to inject the gas onto the surface of the cylinder portion. With such a configuration, the distance (the length of the gas flow along the surface of the tank body) from the portion on the injection port side to the portion on the exhaust port side on the surface of the tank body is reduced, as compared to a case in which the gas is injected onto the dome portions from the axial direction of the cylinder portion. This can suppress a decrease in the gas temperature when the gas flows around the tank body to reach the exhaust port side, thereby enabling to suppress the decrease in the heat transfer rate in the portion on the exhaust port side on the surface of the tank body.

In the apparatus for producing the high-pressure tank in which the tank body includes the cylinder portion and dome portions, in some embodiments, the opening width of the injection port in the radial direction of the cylinder portion is smaller than the outer diameter of the cylinder portion. Such a configuration allows the gas injected from the injection port to be injected with a state narrower in the radial direction (hereinafter also referred to as the width direction) of the cylinder portion than the outer diameter of the cylinder portion, so that most of the gas injected from the injection port abuts the tank body. Thus, the heat transfer rate in the portion on the injection port side on the surface of the tank body is increased. Further, since the gas is injected with a state narrowed in the width direction, when the gas flows along the surface of the tank body, the gas passing a position away from the surface of the tank body can be suppressed. This reduces the amount of gas that does not contribute to the heat transfer to the tank body, so that the heat transfer rate in the portion between the injection port side and the exhaust port side on the surface of the tank body is increased. In addition, since the velocity of the gas injected from the injection port is increased, the flow of the gas on the injection port side of the tank body becomes faster, which also increases the heat transfer rate in the portion on the injection port side on the surface of the tank body. These increase the average heat transfer rate of the overall surface of the tank body, thereby enabling the time for increasing the temperature of the tank body to be reduced, so that the time for heat treatment of the tank body can be further shortened.

In the apparatus for producing the high-pressure tank in which the tank body includes the cylinder portion and dome portions, in some embodiments, the opening width of the exhaust port in the radial direction of the cylinder portion is smaller than the outer diameter of the cylinder portion. Such a configuration allows the gas flowing into the exhaust port to flow with a state narrower in the width direction than the outer diameter of the cylinder portion, so that the gas flowing along the surface of the tank body flows with a state narrower in the width direction than the outer diameter of the cylinder portion in the portion on the exhaust port side on the surface of the tank body. This allows the gas to flow in a wider region on the surface of the tank body, that is, the gas reaches a portion much closer to the exhaust port while flowing along the surface of the tank body. Thus, the heat transfer rate in the portion on the exhaust port side on the surface of the tank body is increased. Further, since the velocity of the gas flowing into the exhaust port is increased, the gas flow on the exhaust port side of the tank body becomes faster. This also increases the heat transfer rate in the portion on the exhaust port side on the surface of the tank body. These increase the average heat transfer rate of the overall surface of the tank body, thereby enabling the time for increasing the temperature of the bank body to be reduced, so that the time for heat treatment of the tank body can be further shortened.

In the apparatus for producing the high-pressure tank in which the tank body includes the cylinder portion and dome portions, in some embodiments, the distance between the injection port and the cylinder portion and the distance between the exhaust port and the cylinder portion are each shorter than the outer diameter of the cylinder portion. In the heating chamber, the gas flow becomes faster in regions closer to the exhaust port as well as the injection port. Therefore, by setting each of the distances between the injection port and the cylinder portion and between the exhaust port and the cylinder portion shorter than the outer diameter of the cylinder portion to bring the tank body closer to the injection port and the exhaust port, the gas flow on the injection port side and the exhaust port side of the cylinder portion becomes faster. This increases the heat transfer rate in the portions on the injection port side and the exhaust port side on the surface of the tank body, thereby increasing the average heat transfer rate of the overall surface of the tank body. Therefore, the time for increasing the temperature of the tank body can be reduced, so that the time for heat treatment of the tank body can be further shortened.

The present disclosure provides a high-pressure tank producing apparatus capable of reducing the time for increasing the temperature of a tank body.

(First Embodiment)

Figure 1:
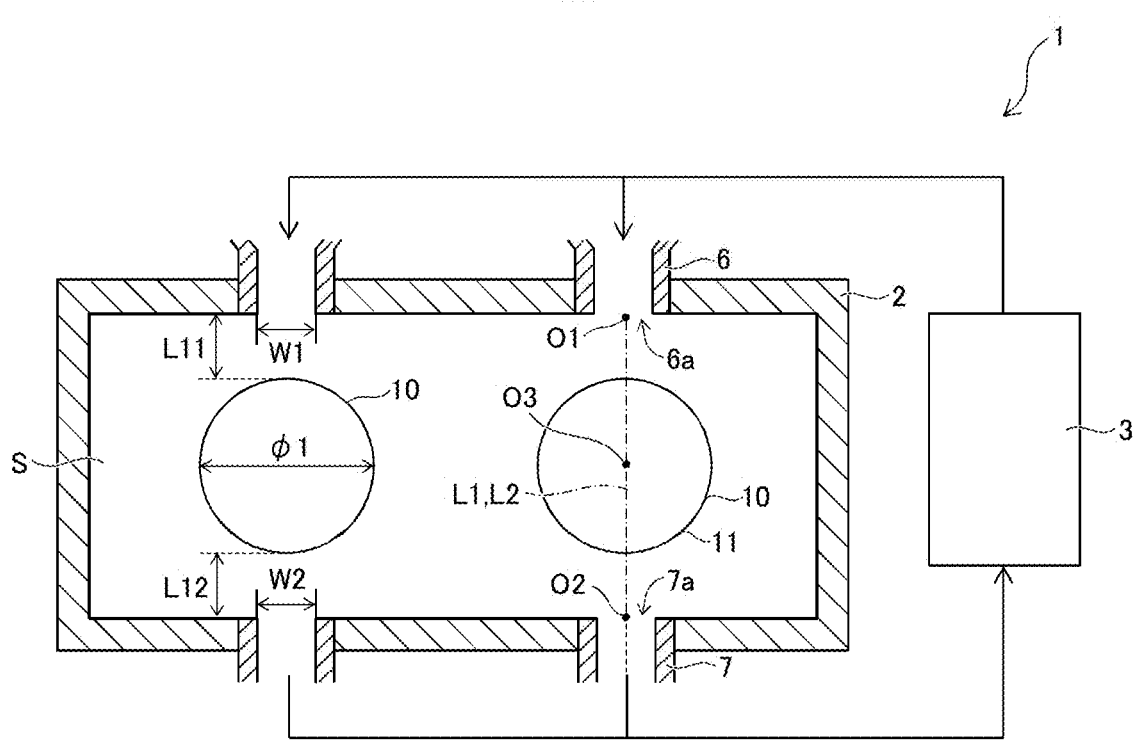
FIG. 1 is a cross-sectional view illustrating the structure of a high-pressure tank producing apparatus according to a first embodiment of the present disclosure as viewed from the axial direction of the high-pressure tank.
Figure 2:
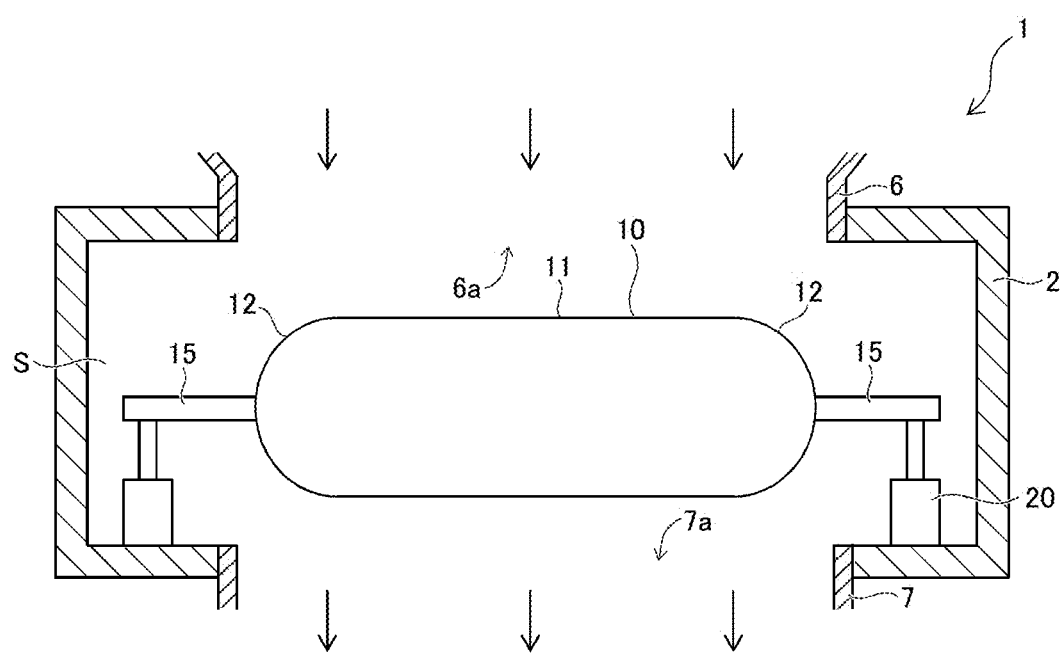
FIG. 2 is a cross-sectional view illustrating the structure of the high-pressure tank producing apparatus according to the first embodiment of the present disclosure as viewed from a side of the high-pressure tank.

With reference to the drawings, a high-pressure tank producing apparatus according to a first embodiment of the present disclosure will be described below. FIG. 1 and FIG. 2 are a cross-sectional view illustrating the structure of the high-pressure tank producing apparatus according to the first embodiment of the present disclosure. As illustrated in FIG. 1 and FIG. 2, a high-pressure tank producing apparatus 1 is used in producing a high-pressure tank by heating a tank body 10 having a fiber-reinforced resin layer with a thermosetting resin to thermally cure the fiber-reinforced resin layer. The high-pressure tank producing apparatus 1 includes a heating chamber 2 for housing and heating the tank body 10, a heating device 3 for heating gas (herein, air), and a retaining mechanism (retaining member) 20 for rotationally retaining the tank body 10.

First, the structure of the high-pressure tank will briefly be described. The high-pressure tank includes the tank body 10 to be filled with gas and a valve (not shown) attached to the tank body 10, for filling and discharging the gas in and from the tank body 10. The tank body 10 is a hollow container having a cylindrical cylinder portion 11 and dome portions 12 provided in opposite end portions in the axial direction of the cylinder portion 11. At the opposite ends of the tank body 10, shafts 15 are detachably formed.

Further, though not shown, the tank body 10 includes a liner having a reservoir space for reserving a high-pressure gas such as hydrogen, and a fiber-reinforced resin layer covering the outer surface of the liner. The liner is formed with a resin material or a light metal material such as aluminum. The fiber-reinforced resin layer is a reinforcing layer covering the outer surface of the liner, and includes reinforcing fibers, such as carbon fibers, wound around the outer surface of the liner, and a thermosetting resin such as an epoxy resin with which the reinforcing fibers are impregnated.

The heating chamber 2 of the high-pressure tank producing apparatus 1 is formed in a substantially box shape, and is provided with a space S for housing the tank body 10. In a predetermined position in an upper portion (herein, the ceiling) of the heating chamber 2, an upper opening for allowing the gas to flow in is provided, while in a predetermined position in a lower portion (herein, the bottom) of the heating chamber 2, a lower opening for discharging the gas is provided.

The heating device 3 is connected to the upper opening via a duct 6 and delivers heated gas into the heating chamber 2. The duct 6 is provided, at its downstream end, with an injection port 6a for injecting the gas heated by the heating device 3 toward the tank body 10. In addition, the heating device 3 is connected to the lower opening via a duct 7 and sucks the gas inside the heating chamber 2. The duct 7 is provided, at its upstream end, with an exhaust port 7a for discharging the gas to the outside of the heating chamber 2. It should be noted that although the example herein shows that the heating chamber 2 is provided with two of each of the injection port 6a and exhaust port 7a, but may be provided with one, or three or more of each port.

The gas heated by the heating device 3 that has become a high-temperature gas passes through the duct 6 and is blown from the injection port 6a onto the cylinder portion 11 of the tank body 10. The gas blown onto the tank body 10 flows along the surface of the tank body 10 while delivering heat to the tank body 10, and is then sucked by the exhaust port 7a. The gas that passes through the duct 7 and flows into the heating device 3 is reheated by the heating device 3 and is then delivered into the duct 6. In this manner, the high-pressure tank producing apparatus 1 is configured to circulate the high-temperature gas.

The retaining mechanism 20 retains the tank body 10 within the heating chamber 2. Specifically, the retaining mechanism 20 rotationally retains shafts 15 attached to the opposite ends of the tank body 10. While the retaining mechanism 20 rotates the tank body 10 about the axis, the heating device 3 blows the high-temperature gas onto the surface of the tank body 10, thereby suppressing unevenly heating the surface of the tank body 10.

Herein, in the present embodiment, as illustrated in FIG. 1, the injection port 6a, the tank body 10, and the exhaust port 7a are aligned on a substantially straight line. Specifically, the exhaust port 7a is disposed in a position (the position directly in front of the injection port 6a) where the injection port 6a is projected in the gas injecting direction. In other words, the injection port 6a and the exhaust port 7a are disposed so as to at least partially overlap with each other as viewed from the gas injecting direction. The injection port 6a and the exhaust port 7a only need to at least partially overlap with each other as viewed from the gas injecting direction, but in some embodiments, of the injection port 6a and the exhaust port 7a, one having a smaller area entirely overlaps with the other one having a larger area, and a center O1 of the injection port 6a and a center O2 of the exhaust port 7a overlap with (correspond to) each other.

Further, the retaining mechanism 20 retains the tank body 10 in a region where the injection port 6a and the exhaust port 7a overlap with each other as viewed from the gas injecting direction and in a position between the injection port 6a and the exhaust port 7a. The tank body 10 only needs to be partially positioned in a region where the injection port 6a and the exhaust port 7a overlap with each other as viewed from the gas injecting direction, but in some embodiments, a center O3 of the tank body 10 is positioned in the region. In addition, as in the present embodiment, in some embodiments, the center O1 of the injection port 6a, the center O2 of the exhaust port 7a, and the center O3 of the tank body 10 overlap with (correspond to) one another.

Furthermore, in the present embodiment, the tank body 10 is positioned on a line L1 extending from the center O1 of the injection port 6a in the gas injecting direction as viewed from the axial direction of the cylinder portion 11 of the tank body 10. In other words, the line L1 extends through the tank body 10 as viewed from the axial direction of the cylinder portion 11. The exhaust port 7a is disposed on a line L2 connecting the center O1 of the injection port 6a and the center O3 of the tank body 10, that is, the line L2 extends through the exhaust port 7a.

As described above, the exhaust port 7a is disposed in a position where the injection port 6a is projected in the gas injecting direction, and the retaining mechanism 20 retains the tank body 10 in a region where the injection port 6a and the exhaust port 7a overlap with each other as viewed from the gas injecting direction and in a position between the injection port 6a and the exhaust port 7a. This allows the high-temperature gas injected from the injection port 6a to flow toward the exhaust port 7a after abutting a portion facing the injection port 6a (herein, the upper portion) of the tank body 10. At this time, since the exhaust port 7a is disposed on the side (herein, the lower side) opposite to the injection port 6a across the tank body 10, the high-temperature gas flows along the surface of the tank body 10 from the portion on the injection port 6a side to the portion on the exhaust port 7a side (the side opposite to the injection port 6a) (herein, the lower portion) of the tank body 10. Therefore, the heat of the high-temperature gas is delivered to a wider region on the surface of the tank body 10, thereby increasing the average heat transfer rate of the overall surface of the tank body 10. Further, with the exhaust port 7a disposed on the side (herein, the lower side) opposite to the injection port 6a across the tank body 10, the gas is unlikely to stagnate below the tank body 10, so that the gas flow becomes faster. This increases the heat transfer rate in the portion (herein, the lower portion) on the exhaust port 7a side as well as the portion (herein, the upper portion) on the injection port 6a side on the surface of the tank body 10, which also increases the average heat transfer rate of the overall surface of the tank body 10. Thus, the time for increasing the temperature of the tank body 10 can be reduced, so that the time for heat treatment of the tank body 10 can be shortened.

Further, in the present embodiment, an opening width W1 of the injection port 6a in the radial direction (herein, in the horizontal direction) of the cylinder portion 11 is formed smaller than an outer diameter $\varphi 1$ of the cylinder portion 11. With this, the gas is injected from the injection port 6a with a state narrower in the radial direction (hereinafter also referred to as the width direction) of the cylinder portion 11 than the outer diameter $\varphi 1$ of the cylinder portion 11, and thus, most of the gas injected from the injection port 6a abuts the tank body 10. Therefore, the heat transfer rate of the portion on the injection port 6a side on the surface of the tank body 10 is increased. In addition, since the gas is injected with a state narrowed in the width direction, when the gas flows along the surface of the tank body 10, the gas passing a position away from the surface of the tank body 10 is suppressed. Accordingly, the amount of gas that does not contribute to the heat transfer to the tank body 10 is reduced, thereby increasing the heat transfer rate in the portion between the injection port 6a side and the exhaust port 7a side on the surface of the tank body 10. Further, since the velocity of the gas injected from the injection port 6a is increased, the gas flow on the injection port 6a side of the tank body 10 becomes faster. This also increases the heat transfer rate in the portion on the injection port 6a side on the surface of the tank body 10. These further increase the average heat transfer rate of the overall surface of the tank body 10, thereby enabling the time for increasing the temperature of the tank body 10 to be reduced, so that the time for heat treatment of the tank body 10 can be further shortened. It should be noted that the opening width W1 of the injection port 6a may be formed equivalent to or larger than the outer diameter φ1 of the cylinder portion 11.

Further, in the present embodiment, an opening width W2 of the exhaust port 7a in the radial direction (herein, in the horizontal direction) of the cylinder portion 11 is formed smaller than the outer diameter co1 of the cylinder portion 11. With this, the gas flows into the exhaust port 7a with a state narrower in the width direction than the outer diameter φ1 of the cylinder portion 11, and thus, the gas flow along the surface of the tank body 10 is made narrower in the width direction than the outer diameter φ1 of the cylinder portion 11 in the portion on the exhaust port 7a side on the surface of the tank body 10. Therefore, the gas flows in a wider region along the surface of the tank body 10, that is, the gas flows along the surface of the tank body 10 to reach a portion much closer to the exhaust port 7a, which increases the heat transfer rate in the portion on the exhaust port 7a side on the surface of the tank body 10. In addition, since the velocity of the gas flowing into the exhaust port 7a is increased, the gas flow on the exhaust port 7a side of the tank body 10 becomes faster, which also increases the heat transfer rate in the portion on the exhaust port 7a side on the surface of the tank body 10. These further increase the average heat transfer rate of the overall surface of the tank body 10, thereby enabling the time for increasing the temperature of the tank body 10 to be reduced, so that the time for heat treatment of the tank body 10 can be further shortened. It should be noted that the opening width W2 of the exhaust port 7a may be formed equivalent to or larger than the outer diameter φ1 of the cylinder portion 11.

Further, a distance L11 between the injection port 6a and the cylinder portion 11 is not particularly limited, but in some embodiments, the distance L11 is shorter than the outer diameter φ1 of the cylinder portion 11, and a distance L12 between the exhaust port 7a and the cylinder portion 11 is not particularly limited, but in some embodiments, the distance L12 is shorter than the outer diameter φ1 of the cylinder portion 11. In regions closer to the exhaust port 7a as well as the injection port 6a within the heating chamber 2, the gas flow becomes faster. Thus, by setting each of the distance L11 between the injection port 6a and the cylinder portion 11 and the distance L12 between the exhaust port 7a and the cylinder portion 11 shorter than the outer diameter φ1 of the cylinder portion 11 to bring the tank body 10 closer to the injection port 6a and the exhaust port 7a, the gas flow on the injection port 6a side and the exhaust port 7a side of the tank body 10 becomes faster. This increases the heat transfer rate in the portions on the injection port 6a side and the exhaust port 7a side on the surface of the tank body 10, so that the average heat transfer rate of the overall surface of the tank body 10 is further increased. Thus, the time for increasing the temperature of the tank body 10 can be reduced, so that the time for heat treatment of the tank body 10 can be further shortened.

In the present embodiment, as described above, the exhaust port 7a is disposed in a position where the injection port 6a is projected in the gas injecting direction, and the retaining mechanism 20 retains the tank body 10 in a region where the injection port 6a and the exhaust port 7a overlap with each other as viewed from the gas injecting direction. This allows the high-temperature gas injected from the injection port 6a to flow toward the exhaust port 7a after abutting a portion facing the injection port 6a (herein, the upper portion) of the tank body 10. At this time, the high-temperature gas flows along the surface of the tank body 10 from the portion on the injection port 6a side to the portion on the exhaust port 7a side of the tank body 10. This allows the heat of the high-temperature gas to be transferred to a wider region on the surface of the tank body 10, so that the average heat transfer rate of the overall surface of the tank body 10 is increased. Further, with the exhaust port 7a disposed below the tank body 10, the gas is unlikely to stagnate below the tank body 10, so that the gas flow becomes faster. This increases the heat transfer rate in the portion (herein, the lower portion) on the exhaust port 7a side as well as the portion (herein, the upper portion) on the injection port 6a side on the surface of the tank body 10, which also increases the average heat transfer rate of the overall surface of the tank body 10. Therefore, the time for increasing the temperature of the tank body 10 can be reduced, so that the time for heat treatment of the tank body 10 can be shortened.

In addition, as described above, since the injection port 6a is provided so as to inject the gas onto the surface of the cylinder portion 11, the distance (the length of the gas flow along the surface of the tank body 10) from the portion on the injection port 6a side to the portion on the exhaust port 7a side on the surface of the tank body 10 is reduced, as compared to a case in which the gas is injected toward the dome portions 12 from the axial direction of the cylinder portion 11. This can suppress a decrease in the temperature of the gas flowing to reach the portion on the exhaust port 7a side of the tank body 10, so that a decrease in the heat transfer rate in the portion on the exhaust port 7a side on the surface of the tank body 10 can be suppressed.

Next, a simulation conducted for verifying the advantageous effects of the high-pressure tank producing apparatus 1 according to the first embodiment of the present disclosure will be described. The simulation was conducted using models of Examples 1-6 corresponding to the high-pressure tank producing apparatus 1 of the present embodiment and a model of Comparative Example not corresponding to the high-pressure tank producing apparatus 1 of the present embodiment.

(Example 1)

Figure 3:
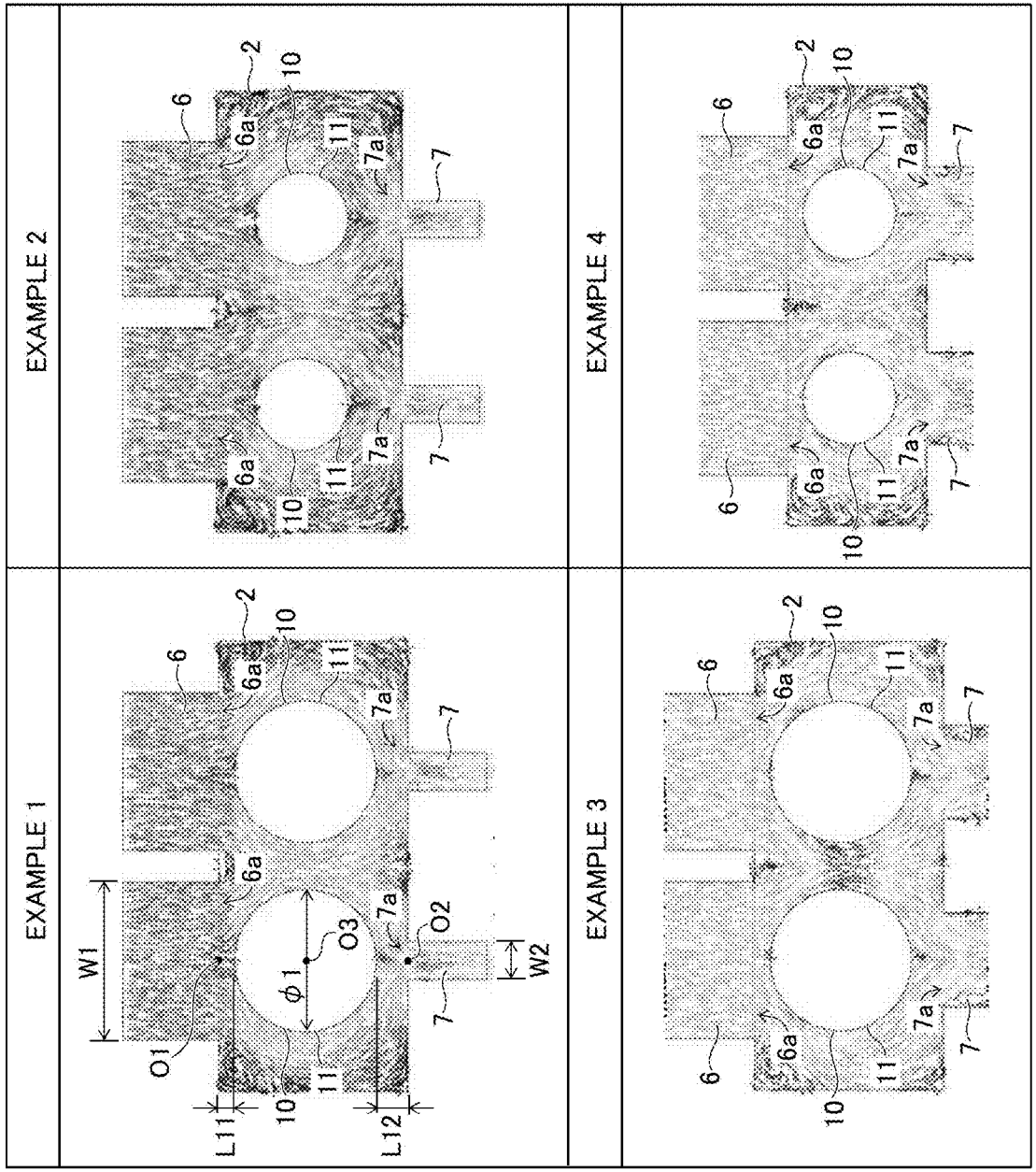
FIG. 3 illustrates gas flows of models of Examples 1 to 4 corresponding to the high-pressure tank producing apparatus according to the first embodiment of the present disclosure.

As illustrated in FIG. 3, in Example 1, the center O1 of the injection port 6a, the center O3 of the tank body 10, and the center O2 of the exhaust port 7a are aligned on a straight line. Further, the opening width W1 of the injection port 6a, the opening width W2 of the exhaust port 7a, and the outer diameter φ1 of the cylinder portion 11 of the tank body 10 ware set to 500 mm, 150 mm, and 500 mm, respectively, and the distance from the injection port 6a to the exhaust port 7a was set to 650 mm. At this time, the distance L11 from the injection port 6a to the tank body 10 was set to 50 mm, and the distance L12 from the exhaust port 7a to the tank body 10 was set to 100 mm. The other part of the configuration of Example 1 was the same as that of the first embodiment.
(Example 2)

In Example 2, the outer diameter φ1 of the tank body 10 was set to 300 mm. Further, the center O3 of the tank body 10 was placed in the same position as that of Example 1. At this time, the distance L11 from the injection port 6a to the tank body 10 was set to 150 mm, and the distance L12 from the exhaust port 7a to the tank body 10 was set to 200 mm. The other part of the configuration of Example 2 was the same as that of Example 1.
(Example 3)

In Example 3, the opening width W2 of the exhaust port 7a was set to 300 mm. The other part of the configuration of Example 3 was the same as that of Example 1.
(Example 4)

In Example 4, the opening width W2 of the exhaust port 7a was set to 300 mm, and the outer diameter φ1 of the tank body 10 was set to 300 mm. In addition, the distance from the injection port 6a to the exhaust port 7a was set to 450 mm. At this time, the distance L11 from the injection port 6a to the tank body 10 was set to 50 mm, and the distance L12 from the exhaust port 7a to the tank body 10 was set to 100 mm. The other part of the configuration of Example 4 was the same as that of Example 1.
(Example 5)

Figure 4:
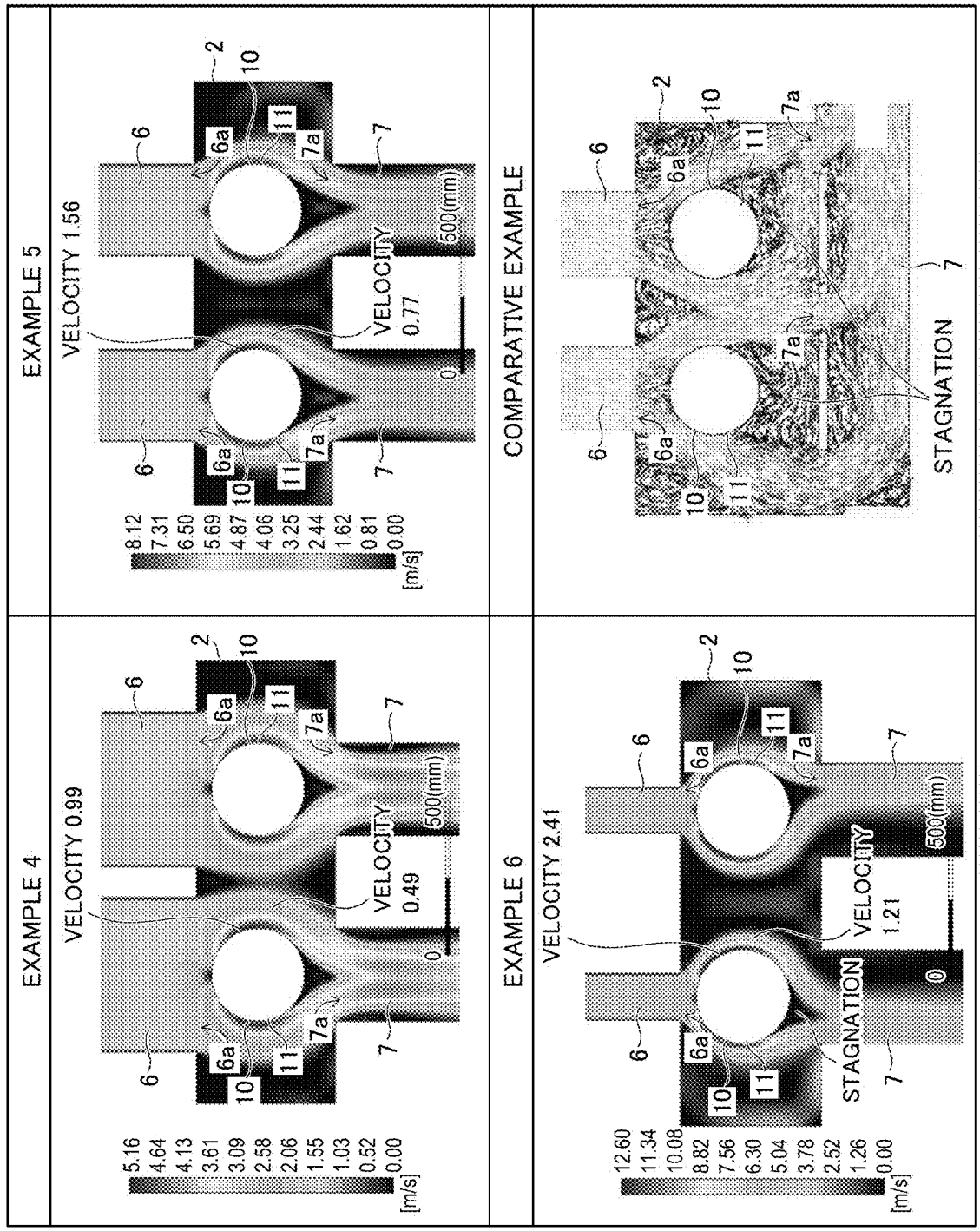
FIG. 4 illustrates gas flows of models of Examples 4 to 6 corresponding to the high-pressure tank producing apparatus according to the first embodiment of the present disclosure and a gas flow of a model of Comparative Example not corresponding to the high-pressure tank producing apparatus according to the first embodiment of the present disclosure.

As illustrated in FIG. 4, in Example 5, the opening width W1 of the injection port 6a was set to 300 mm. The other part of the configuration of Example 5 was the same as that of Example 4.
(Example 6)

In Example 6, the opening width W1 of the injection port 6a was set to 150 mm. The other part of the configuration of Example 6 was the same as that of Example 4.
(Comparative Example)

In Comparative Example, the injection port 6a and the exhaust port 7a were disposed in a staggered manner so as not to overlap with each other as viewed from the gas injecting direction. That is, the exhaust port 7a was disposed in a position deviated from the position where the injection port 6a was projected in the gas injecting direction. Further, the tank body 10 was placed such that the center O3 of the tank body 10 and the center O1 of the injection port 6a overlap with each other as viewed from the gas injecting direction. Furthermore, the opening width W1 of the injection port 6a, the opening width W2 of the exhaust port 7a, and the outer diameter φ1 of the tank body 10 were set to 300 mm, 200 mm, and 300 mm, respectively, and the distance from the injection port 6a to the exhaust port 7a was set to 650 min. At this time, the distance L11 from the injection port 6a to the tank body 10 was set to 150 mm and the distance L12 from the exhaust port 7a to the tank body 10 was set to 200 mm. The other part of the configuration of Comparative Example was the same as that of Example 1.

Then, a CAE analysis was conducted on the increase in the temperature of the tank body 10 using the models of Examples 1 to 6 and Comparative Example. At this time, the initial temperature of the tank body 10 was set to 100° C., the gas temperature at the injection port 6a was set to 150° C., the rotational speed of the tank body 10 was set to 3 rpm, and the amount of gas injected from the injection port 6a was made constant. Further, based on the increase in temperature of the tank body 10 obtained through the analysis, the average heat transfer rate of the overall surface of the tank body 10 was calculated. The results are shown in Table 1 and FIGS. 3 and 4. It should be noted that in FIGS. 3 and 4, regarding Examples 1 to 3 and Comparative Example, the gas flow is indicated with lines, while regarding Examples 5 and 6, the gas velocity is indicated with colors (with shades). In addition, regarding Example 4, the gas flow is indicated with lines in FIG. 3, and the gas velocity is indicated with colors (with shades) in FIG. 4. The average heat transfer rate and the gas velocity were standardized by setting each of the values of Example 6 as "1."

TABLE 1

| | Opening width of injection port [mm] | Opening width of exhaust port [mm] | Outer diameter of tank body [mm] | Gas velocity at injection port | Average heat transfer rate |
|---|---|---|---|---|---|
| Example 1 | 500 | 150 | 500 | 0.30 | 0.60 |
| Example 2 | 500 | 150 | 300 | 0.30 | 0.55 |
| Example 3 | 500 | 300 | 500 | 0.30 | 0.59 |
| Example 4 | 500 | 300 | 300 | 0.30 | 0.58 |
| Example 5 | 300 | 300 | 300 | 0.50 | 0.72 |
| Example 6 | 150 | 300 | 300 | 1 | 1 |
| Comparative Example | 300 | 200 | 300 | 0.50 | 0.37 |

As shown in Table 1, the average heat transfer rates of Examples 1 to 6 and Comparative Example were 0.60, 0.55, 0.59, 0.58, 0.72, 1, and 0.37, respectively. It should be noted that when the opening width W1 of the injection port 6a was set to 500 mm, 300 mm, and 150 mm, the gas velocity at the injection port 6a was 0.30, 0.50, and 1, respectively.

With reference to Examples 1 and 2, it has been proved that when the examples have an equal opening width W1 of the injection port 6a and an equal opening width W2 of the exhaust port 7a, the one having the larger outer diameter φ1 of the tank body 10 has the higher average heat transfer rate. The reason is considered as follows. When the outer diameter φ1 of the tank body 10 is increased, the distance L11 between the injection port 6a and the cylinder portion 11 and the distance L12 between the exhaust port 7a and the cylinder portion 11 are reduced. This brings the surface of the tank body 10 closer to the injection port 6a and the exhaust port 7a, so that the gas flow becomes faster in the portions on the injection port 6a side and the exhaust port 7a side on the surface of the tank body 10. Therefore, it is considered that the heat transfer rate in the portions on the injection port 6a side and the exhaust port 7a side of the tank body 10 was increased.

With reference to Examples 1 and 3, it has been proved that when the examples have an equal opening width W1 of the injection port 6a and an equal outer diameter φ1 of the tank body 10, the one having the smaller opening width W2 of the exhaust port 7a has the higher average heat transfer rate. The reason is considered as follows. As the opening width W2 of the exhaust port 7a is reduced, the flow of gas flowing into the exhaust port 7a is further narrowed in the width direction, and therefore, the gas flow along the surface of the tank body 10 is further narrowed in the width direction in the portion on the exhaust port 7a side on the surface of the tank body 10. Thus, the gas flows in a wider region along the surface of the tank body 10, that is, the gas flows along the surface of the tank body 10 to reach a portion much closer to the exhaust port 7a. This increases the heat transfer rate in the portion on the exhaust port 7a side on the surface of the tank body 10. Further, since the velocity of the gas flowing into the exhaust port 7a is increased, the gas flow on the exhaust port 7a side of the tank body 10 becomes faster, which also increases the heat transfer rate in the portion on the exhaust port 7a side on the surface of the tank body 10. These are considered to be the reason why the average heat transfer rate of the overall surface of the tank body 10 was increased.

With reference to Examples 2 and 4, it has been proved that when the examples have an equal opening width W1 of the injection port 6a and an equal outer diameter φ1 of the tank body 10, the one having the shorter distance L11 between the injection port 6a and the cylinder portion 11 and the shorter distance L12 between the exhaust port 7a and the cylinder portion 11 has the higher average heat transfer rate. The reason is considered as follows. As the distance L11 between the injection port 6a and the cylinder portion 11 and the distance L12 between the exhaust port 7a and the cylinder portion 11 are reduced to bring the tank body 10 closer to the injection port 6a and the exhaust port 7a, the gas velocity on the injection port 6a side and the exhaust port 7a side of the tank body 10 is increased. This is considered to be the reason why the heat transfer rate on the injection port 6a side and the portion on the exhaust port 7a side on the surface of the tank body 10 were increased.

With reference to Examples 4 to 6 shown in Table 1 and FIG. 4, it has been proved that when the examples have an equal opening width W2 of the exhaust port 7a and an equal outer diameter φ1 of the tank body 10, the one having the smaller opening width W1 of the injection port 6a has the higher average heat transfer rate. The reason is considered as follows. As the opening width W1 of the injection port 6a is reduced, the flow of gas injected from the injection port 6a is further narrowed in the width direction, and therefore, a larger amount of gas injected from the injection port 6a abuts the tank body 10. This increases the heat transfer rate in the portion on the injection port 6a side on the surface of the tank body 10. Further, since the gas is injected with a state narrowed in the width direction, when the gas flows along the surface of the tank body 10, the gas passing a position away from the surface of the tank body 10 can be suppressed. This reduces the amount of gas that does not contribute to the heat transfer to the tank body 10, thereby increasing the heat transfer rate in the portion between the injection port 6a side and the exhaust port 7a side on the surface of the tank body 10. Further, since the velocity of the gas injected from the injection port 6a is increased, the gas flow on the injection port 6a side of the tank body 10 becomes faster, which also increases the heat transfer rate in the portion on the injection port 6a side on the surface of the tank body 10. These are considered to be the reason why the average heat transfer rate of the overall surface of the tank body 10 was increased.

In view of the foregoing, it has been proved that as the opening width W1 of the injection port 6a and the opening width W2 of the exhaust port 7a are reduced, and the distance L11 between the injection port 6a and the cylinder portion 11 and the distance L12 between the exhaust port 7a and the cylinder portion 11 are reduced, the gas velocity on the periphery of the tank body 10 is increased, so that the average heat transfer rate of the overall surface of the tank body 10 is increased.

It should be noted that as the opening width W2 of the exhaust port 7a is reduced, the average heat transfer rate is increased, but the pressure loss of the gas passing through the exhaust port 7a becomes large. Therefore, the gas with a higher pressure needs to be injected from the injection port 6a. Thus, when the opening width W2 of the exhaust port 7a is set larger, the apparatus for injecting gas can be downsized.

With reference to Examples 1 to 6 (in particular, Example 2) and Comparative Example shown in Table 1 and FIG. 3 and FIG. 4, it has been proved that when the exhaust port 7a is disposed in a position where the injection port 6a is projected in the gas injecting direction, the average heat transfer rate is significantly increased, as compared to a case in which the exhaust port 7a is disposed in a position that is deviated from the position where the injection port 6a is projected in the gas injecting direction (Comparative Example). The reason is considered as follows. When the exhaust port 7a is disposed in a position that is deviated from the position where the injection port 6a is projected in the gas injecting direction, as shown in Comparative Example in FIG. 4, the gas that has abutted the tank body 10 to flow toward the exhaust port 7a does not reach the lower side (the portion on the other side of the injection port 6a) of the tank body 10, and stagnates in the portion below the tank body 10. Thus, the heat transfer rate in the portion on the side opposite to the injection port 6a on the surface of the tank body 10 is decreased.

It should be noted that the times required for increasing the temperature of the tank body 10 from 100° C. to 150° C. in Example 3 and Comparative Example were 25 minutes and 40 minutes, respectively. That is, the time required for increasing the temperature of the tank body 10 can be reduced by about 37%. Further, since the average heat transfer rates of Examples 1, 5, and 6 are each higher than that of Example 3, the time required for increasing the temperature of the tank body 10 can be further reduced.

Figure 5:
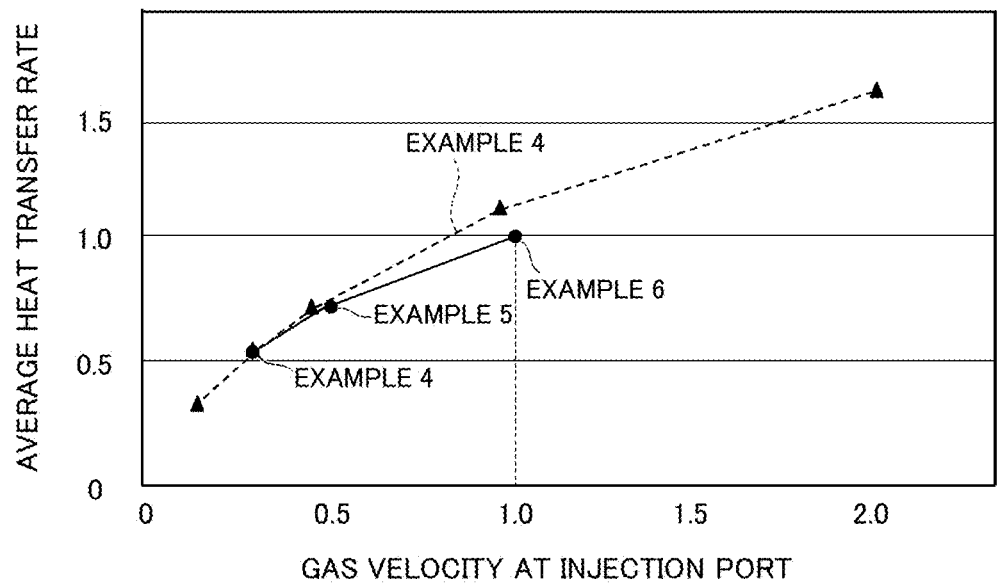
FIG. 5 is a graph showing the relation between a gas velocity at an injection port and an average heat transfer rate in Examples 4 to 6 corresponding to the high-pressure tank producing apparatus according to the first embodiment of the present disclosure.

Next, to confirm the relation between the velocity of gas injected from the injection port 6a and the average heat transfer rate, a simulation was conducted. Herein, using the model of Example 4, the gas velocity at the injection port 6a was set to five levels of 0.15, 0.30, 0.45, 0.97, and 2.06 by varying the amount of gas injected from the injection port 6a. Then, the average heat transfer rate of the overall surface of the tank body 10 was calculated while the CAE analysis was conducted on the increase in the temperature of the tank body 10 in the same method as mentioned above. The results are shown in FIG. 5. It should be noted that FIG. 5 also shows the average heat transfer rates of the aforementioned Examples 4 to 6 obtained by differentiating the opening width W1 of the injection port 6a to vary the gas velocity while maintaining the amount of gas injected from the injection port 6a constant.

With reference to FIG. 5, it has been provided that as the velocity of the gas injected from the injection port 6a is increased, the average heat transfer rate is increased. That is, it has been proved that the average heat transfer rate of the overall surface of the tank body 10 is increased by increasing the velocity of the gas injected from the injection port 6a with the same structure (see Example 4) as well as by reducing the opening width W1 of the injection port 6a to make the flow of the gas injected from the injection port 6a faster (see Examples 4 to 6).

(Second Embodiment)

Figure 6:
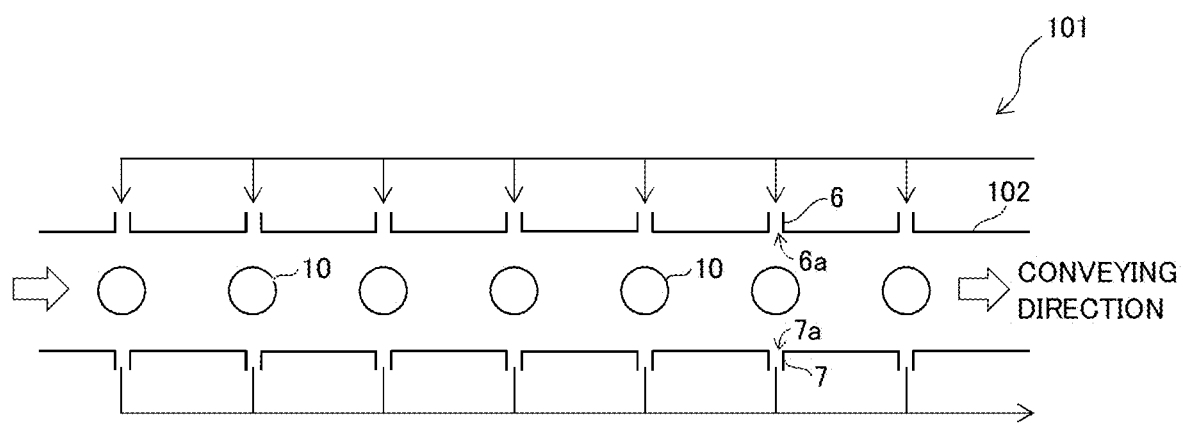
FIG. 6 is a cross-sectional view illustrating the structure of a high-pressure tank producing apparatus according to a second embodiment of the present disclosure as viewed from the axial direction of the high-pressure tank.

A high-pressure tank producing apparatus 101 according to a second embodiment of the present disclosure includes a heating chamber 102 as a continuous furnace that continuously conveys and heats the high-pressure tank 10 as illustrated in FIG. 6, unlike the aforementioned first embodiment. It should be noted that the heating chamber 102 is provided, on its downstream side, with a cooling chamber (not shown) to slow cooling of the heated tank body 10.

The heating chamber 102 is formed such that a plurality of heating chambers 2 of the aforementioned first embodiment is continuously provided. Specifically, in a predetermined position of an upper portion (herein, the ceiling) of the heating chamber 102, a downstream end (injection port 6a) of the duct 6 is provided, and in a predetermined position of a lower portion (herein, the bottom) of the heating chamber 102, an upstream end (exhaust port 7a) of the duct 7 is provided. The exhaust port 7a is provided in a position (position where the injection port 6a is projected in the gas injecting direction) immediately below the injection port 6a. The injection ports 6a and the exhaust ports 7a are disposed with a predetermined pitch along the direction in which the tank body 10 is conveyed. It should be noted that the ducts 6 and 7 are connected to the heating device 3 in the same manner as in the aforementioned first embodiment.

At the opposite ends of the tank body 10, the shafts 15 are attached and a retaining mechanism (not shown) for rotationally retaining the shafts 15 is provided. The retaining mechanism of the present embodiment is configured such that the tank body 10 is conveyed along the heating chamber 102, unlike the retaining mechanism 20 of the aforementioned first embodiment. The retaining mechanism of the present embodiment is not particularly limited as long as the tank body 10 can be conveyed, but may be configured with a chain conveyor or the like.

This retaining mechanism is adapted to place the tank body 10 in a position immediately below the injection port 6a and immediately above the exhaust port 7a (in a region where the injection port 6a and the exhaust port 7a overlap with each other as viewed from the gas injecting direction) and retain the tank body 10 for a predetermined period of time, and then convey it by the aforementioned predetermined pitch (the pitch with which the injection ports 6a and the exhaust ports 7a are disposed). In this manner, the tank body 10 is placed in the position immediately below the injection port 6a and immediately above the exhaust port 7a that are adjacent ones on the downstream side. By repeating this, the tank body 10 is conveyed by a pitch within the heating chamber 102, and the injection port 6a, the tank body 10, and the exhaust port 7a are aligned on a substantially straight line in the same manner as in the aforementioned first embodiment, except the time while the tank body 10 is being conveyed.

In the present embodiment, as described above, the exhaust port 7a is disposed in a position where the injection port 6a is projected in the gas injecting direction, and during most of the time of heat treatment of the tank body 10 (except the time while the tank body 10 is being conveyed), the tank body 10 is retained in a region where the injection port 6a and the exhaust port 7a overlap with each other as viewed from the gas injecting direction. This increases the average heat transfer rate of the overall surface of the tank body 10 similarly to the aforementioned first embodiment, thereby enabling the time for increasing the temperature of the tank body 10 to be reduced, so that the heat treatment time of the tank body 10 can be shortened.

It should be noted that the embodiments disclosed herein are mere examples in any and all aspects, and should not be considered restrictive. The scope of the present disclosure is specified in the scope of the claims, but not in the description of the aforementioned embodiments, and further, encompasses any and all changes in the meaning equivalent to and within the scope of the claims.

For example, the aforementioned embodiments show the example of blowing a high-temperature gas onto the tank body from above, but the present disclosure is not limited thereto, and the gas may be blown onto the tank body from below or the side.

Further, the aforementioned embodiments show the example in which the heating chamber is formed so as to house the tank body laid on its side, but in the present disclosure is not limited thereto, and the heating chamber may be formed so as to house the tank body placed vertically (with the center axis of the tank body extending in the vertical direction).

Moreover, the aforementioned embodiments show the example of blowing a high-temperature gas onto the cylinder portion from the radial direction of the cylinder portion, but the present disclosure is not limited thereto, and the high-temperature gas may be blown toward the dome portions from the axial direction of the cylinder portion. In that case, however, when the tank body is long in the axial direction, the difference between the temperature of the gas abutting a portion on the injection port side on the surface of the tank body and the temperature of the gas flowing along a portion on the exhaust port side on the surface of the tank body is widened, which likely causes the tank body to be unevenly heated. Therefore, the high-temperature gas may be blown toward the cylinder portion from the radial direction of the cylinder portion.

Further, the aforementioned embodiments show the example in which the retaining mechanism is disposed inside the heating chamber, but the present disclosure is not limited thereto. In the present disclosure, the retaining mechanism may not need to be disposed inside the heating chamber as long as the tank body can be retained within the heating chamber. For example, the retaining mechanism may be disposed outside the heating chamber, and the shafts attached to the opposite ends of the tank body may be extended to the outside of the heating chamber.

Furthermore, the aforementioned embodiments show the example in which the retaining mechanism (retaining member) is provided so as to rotationally retain the tank body, but the present disclosure is not limited thereto, and the retaining mechanism (retaining member) may be provided so as to non-rotationally retain the tank body.

What is claimed is:

1. A high-pressure tank producing apparatus that heats a tank body with fibers impregnated with a thermosetting resin wound around its surface so as to cure the thermosetting resin, the high-pressure tank producing apparatus comprising:

a heating chamber adapted to house the tank body; and
a support adapted to retain the tank body within the heating chamber,
wherein:
the tank body comprises a cylindrical cylinder portion and dome portions provided at opposite end portions in an axial direction of the cylinder portion,
the heating chamber has an injection port for injecting heated gas onto a surface of at least the cylinder portion of the tank body and an exhaust port for discharging the gas to an outside of the heating chamber, the exhaust port being disposed in a position opposite to the injection port with respect to the tank body in a gas injecting direction and where the injection port is projected in the gas injecting direction,
the support retains the tank body in a region where the injection port and the exhaust port overlap with each other as viewed from the gas injecting direction and in a position between the injection port and the exhaust port, a distance between the injection port and the cylinder portion and a distance between the exhaust port and the cylinder portion are each shorter than an outer diameter of the cylinder portion, the tank body is one of a plurality of tank bodies, the injection port is one of a plurality of injection ports, the exhaust port is one of a plurality of exhaust ports, the heating chamber is a continuous furnace comprising a plurality of pairs of the injection ports and the exhaust ports, the continuous furnace being configured to continuously convey and heat a plurality of the tank bodies conveyed through the continuous furnace along a direction intersecting a center axis of each of the plurality of tank bodies and intersecting a plurality of the gas injecting directions defined between each of the plurality of pairs of the injection ports and the exhaust ports, the plurality of the pairs of the injection ports and the exhaust ports being disposed with a predetermined pitch along the direction in which the plurality of tank bodies are conveyed and heated, and the support is adapted to periodically retain each of the plurality of high-pressure tank bodies at the predetermined pitch along the direction in which the plurality of tank bodies are conveyed, in alignment with a respective one of the plurality of pairs of the injection ports and the exhaust ports for a predetermined period of time.

2. The high-pressure tank producing apparatus according to claim 1, wherein an opening width of the injection port in a radial direction of the cylinder portion is smaller than the outer diameter of the cylinder portion.

3. The high-pressure tank producing apparatus according to claim 1, wherein an opening width of the exhaust port in a radial direction of the cylinder portion is smaller than the outer diameter of the cylinder portion.

* * * * *